July 1, 1958 H. N. PEPPERCORN ET AL 2,840,893
MACHINE FOR INSERTING THE CORES OF RESILIENT BUSHINGS
Filed May 11, 1954 3 Sheets-Sheet 2
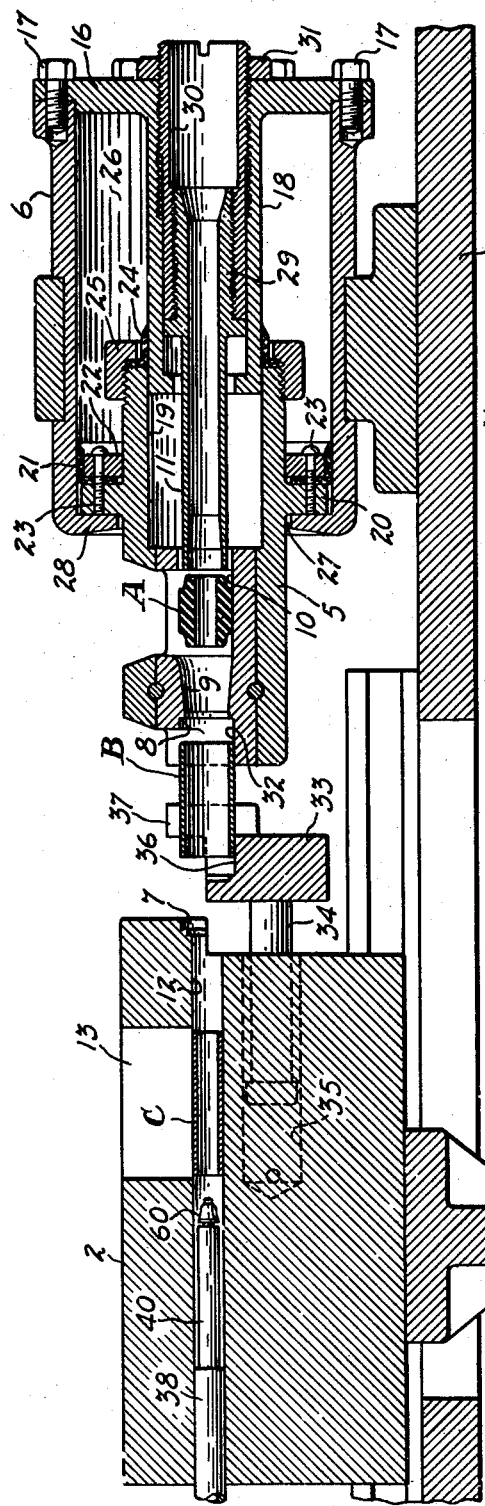
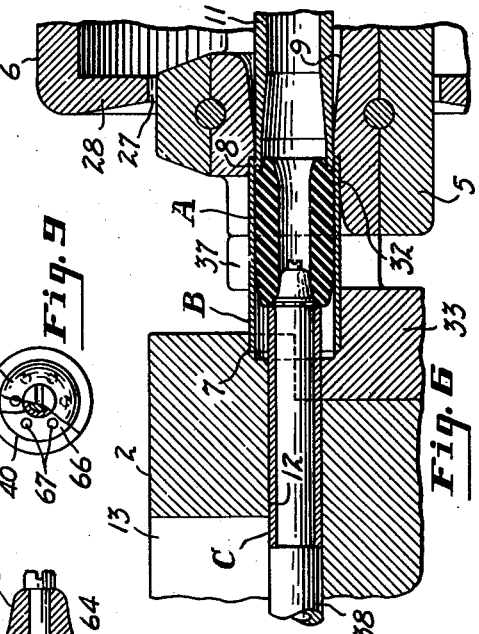
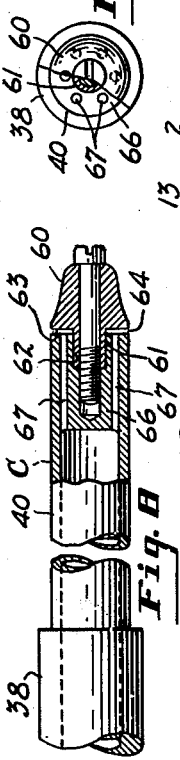
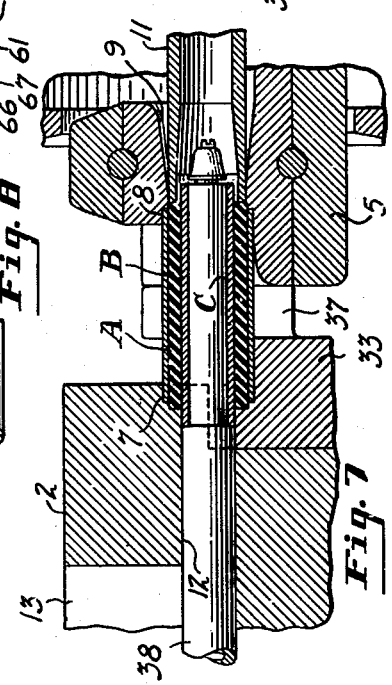
INVENTORS
*Howard N. Peppercorn*
*Eldon Paul Neher*
BY *Evans + McCoy*
ATTORNEYS July 1, 1958  H. N. PEPPERCORN ET AL  2,840,893
MACHINE FOR INSERTING THE CORES OF RESILIENT BUSHINGS
Filed May 11, 1954  3 Sheets-Sheet 2
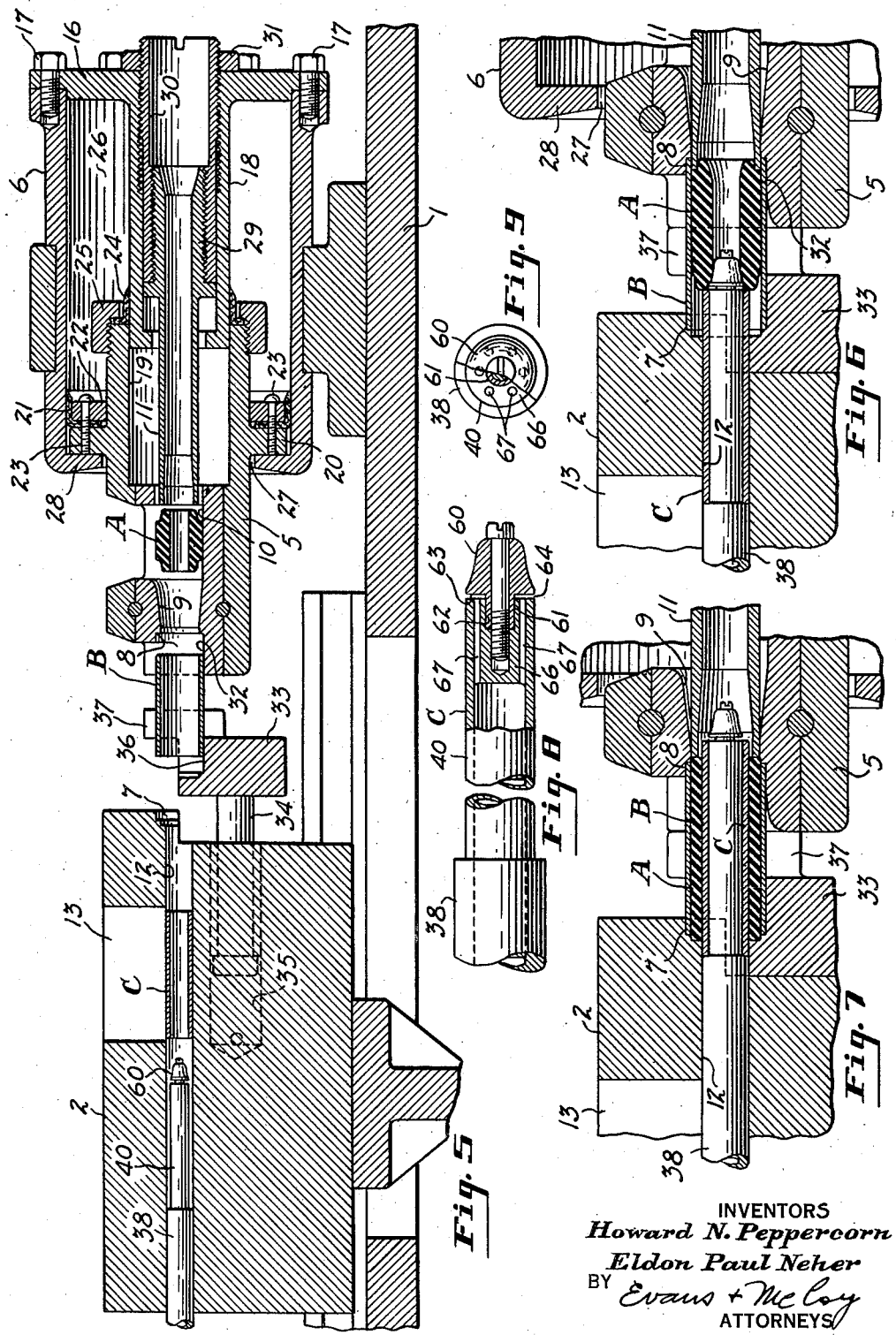
INVENTORS
*Howard N. Peppercorn*
*Eldon Paul Neher*
BY *Evans + McCoy*
ATTORNEYS

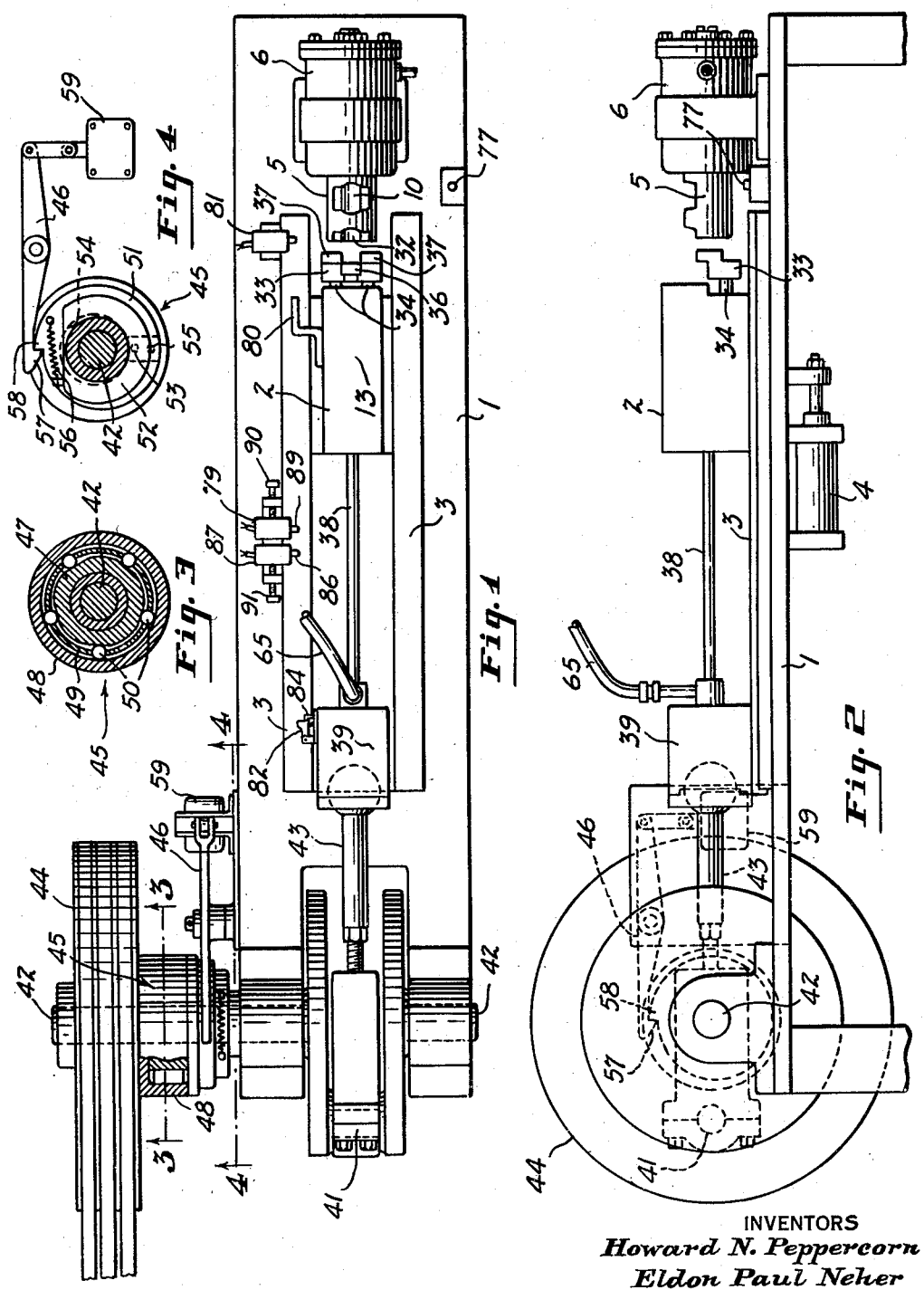

United States Patent Office 2,840,893
Patented July 1, 1958

2,840,893

MACHINE FOR INSERTING THE CORES OF RESILIENT BUSHINGS

Howard N. Peppercorn, Logansport, and Eldon P. Neher, Burrows, Ind., assignors to The General Tire and Rubber Company, Akron, Ohio, a corporation of Ohio Application May 11, 1954, Serial No. 428,991

3 Claims. (Cl. 29—235)

This invention relates to machines for assembling resilient bushings of the type in which a tubular elastic rubber insert is held under radial compression in the annular space between an outer rigid sleeve of an internal diameter considerably less than the normal external diameter of the insert and an inner rigid core of an external diameter greater than the normal internal diameter of the insert and, more particularly, to an improved means for entering the core into the insert after the insert has been forced into the outer sleeve.

The device of the present invention is shown applied to a machine in which the rubber insert and outer sleeve are placed in axial alinement between relatively movable press members which upon closing movement force the rubber insert into the sleeve and comprises means for entering a core into the insert within the sleeve while the sleeve and its insert are clamped by the press members.

The core is forced into the insert by means of a plunger that is provided at its insert engaging end with a core supporting portion of reduced diameter upon which a core fits and with a tapered pilot immediately in advance of the core supporting portion. The larger end of the pilot is of no greater diameter than the core receiving portion of the plunger so that the core will readily slip over the pilot and onto the core supporting portion and so that the core pilot is retractable through an assembled bushing upon the return stroke of the plunger. In order to facilitate the entry of the core into the insert, means is provided for discharging a liquid under pressure radially from the plunger immediately in advance of the core during the portion of the plunger stroke in which the pilot is passing through the insert and the core is moving into the insert. The liquid under pressure, so discharged, serves to progressively expand the insert immediately in advance of the core while the core is moving into the insert and to lubricate the insert and the core so as to lessen the frictional resistance to the movement of the core into the insert.

Objects of the invention are to provide a bushing assembling machine of the character described with means for subjecting the elastic rubber insert confined within an outer rigid sleeve to internally applied fluid pressure during the portion of the stroke in which the core is entering the insert and to effectively lubricate the core and insert during the entry of the insert into the core.

Reference should be had to the accompanying drawings forming a part of this specification, in which:

Figure 1 is a top plan view of a machine embodying the invention;

Fig. 2 is a side elevation of the machine;

Fig. 3 is a section through the single revolution clutch that controls operation of the core inserting plunger, taken on the line indicated at 3—3 in Fig. 1;

Fig. 4 is a section taken on the line indicated at 4—4 in Fig. 1, showing the clutch controlling latch;

Fig. 5 is a fragmentary longitudinal central vertical section through the machine, showing the parts of the bushing positioned for the assembling operation;

Fig. 6 is a fragmentary vertical section showing the work pressing members in clamping position, the rubber insert within the sleeve and the plunger about to enter the insert;

Fig. 7 is a fragmentary vertical section showing the core inserting plunger at the end of its core inserting stroke and showing the bushing fully assembled;

Fig. 8 is a view showing the core receiving end of the core inserting plunger partly in section and partly in side elevation;

Fig. 9 is an end elevation of the plunger with the pilot portion partially broken away to show the fluid passages in the body of the plunger; and Fig. 10 is a diagrammatic view showing the pressure connections and the control means for effecting the proper sequence of operations.

Referring to the accompanying drawings, the machine of the present invention is designed to automatically assemble a resilient bushing that comprises an elastic rubber insert A, an outer sleeve B and an inner tubular core C. As shown in Fig. 5, the elastic rubber insert A is normally of an external diameter materially greater than the internal diameter of the sleeve B and of an internal diameter materially less than the external diameter of the core C. When the insert is placed in the annular space between the core C and sleeve B it is elongated axially as shown in Fig. 7 and is held under a radial compression that is sufficient to provide a strong frictional bond between the rubber insert A and the sleeve B and between the insert A and the core C.

The machine of the present invention is mounted on a suitable bed 1 and is provided with a movable pressure applying and clamping member 2 that is mounted on the bed to slide along a longitudinal way 3. The pressure applying member 2 is part of an insert and sleeve assembling press and is operated by a suitable power means such as a fluid pressure cylinder 4. A work clamping member 5 is opposed to the pressure applying and clamping member 2 and is slidable in a fixed cylindrical housing 6 whose axis is disposed parallel to the way 3. As best shown in Fig. 6, the opposed faces of the work clamping members 2 and 5 are provided with axially alined sleeve positioning sockets 7 and 8, and the member 5 is provided with a funnel-shaped insert guide 9 that is axially alined with the socket 8 and that is disposed with its small end opening to the socket 8. The member 5 is also provided with an insert receiving seat 10 adjacent the large end of the funnel guide 9 that supports an insert A in axial alinement with the funnel guide 9. A tubular insert engaging plunger 11 is mounted in fixed position within the housing 6 and in axial alinement with the funnel guide 9 for engagement with an insert A as the work clamping member 5 is moved into the housing 6 by the member 2 to force the insert A through the funnel guide 9 into a sleeve B clamped between the members 2 and 5.

The pressure applying work clamping member 2 is provided with a bore 12 that is in axial alinement with its socket 7 and which opens into the socket 7. The bore 12 is of a diameter to receive a core member C with a sliding fit and the member 2 is provided with an elongated slot 13 through which an insert C may be introduced into the bore 12.

The cylindrical housing 6 is closed at its outer end by a detachable head 16 secured to the body of the housing by bolts 17. As best shown in Fig. 5, the head 16 has an integral externally cylindrical projection 18 that extends inwardly into the interior of the housing 6 providing a guide for the work gripping member 5 which has an interiorly cylindrical socket portion 19 at its outer end that slidably receives the projection 18. The socket portion 19 serves as a piston and has an external circumferential flange 20 to which a packing ring 21 is clamped by means of a retaining ring 22 and screws 23. The packing ring 21 engages the cylindrical interior of the housing 6 and a second packing ring 24 clamped to the outer end of the socket portion 19 by a threaded collar 25 engages the cylindrical exterior of the projection 18 providing a pressure chamber 26 between the socket portion 19 and the head 16 of the housing 6.

The pressure chamber 26 is adapted to receive air under suitable pressure and provides an air spring for yieldably resisting movement of the member 5 into the housing 6 when pressure is applied to the member 5 by the work pressing member 2. The inner end of the housing 6 is provided with an opening 27 through which the inner end of the work gripping member 5 projects and an inwardly projecting flange 28 surrounding the opening 27 provides a stop against which the flange 20 engages, as shown in Fig. 5 to limit the inward movement of the member 5. The tubular plunger 11 is detachably mounted in the head 16 and has a threaded outer end 29 that is screwed into an adjusting sleeve 30 mounted in the head 16. The sleeve 30 is adjustable axially to properly position the insert engaging inner end of the plunger 11, the sleeve 30 having a screw threaded engagement with the interior of the tubular projection 18 and being held in adjusted position by a lock nut 31.

The clamping member 5 has a sleeve seat 32 that projects inwardly toward the pressure applying clamping member 2 to receive an end of a sleeve B and support the same in alinement with the socket 8 and funnel 9. The work pressing member 2 has a retractable sleeve supporting member 33 that is carried by parallel horizontal pistons 34 that slide in cylinders 35 in the member 2. The retractable member 33 has its top edge at the axis of the bore 12, forms the lower half of the socket 7 when in retracted position and provides a seat 36 for one end of the sleeve B when extended as shown in Fig. 5. The air pressure in the cylinders 35 normally holds the member 33 in extended position as shown in Fig. 5 to position its inner face at a distance from the seat 32 less than the length of a sleeve B so that a sleeve B can be supported on the seats 32 and 36 in axial alinement with the sockets 7 and 8. The member 33 is provided with spaced vertical projections 37 on opposite sides of the seat 36 that engage with the inner face of the work gripping member 5 to transmit thrust from the member 2 to the member 5 when the sleeve B is engaged by the sockets 7 and 8.

After an insert A has been positioned on the seat 10 and a sleeve B has been positioned on the seats 32 and 36, as shown in Fig. 5, pressure is admitted to the cylinder 4 to advance the member 2 toward the member 5, causing the extensions 37 to engage the inner face of the member 5 on opposite sides of the sleeve so that upon continued movement of the member 2 the sleeve supporting member 33 is retracted and the sleeve B is engaged in the sockets 7 and 8. After the sleeve B is clamped between the members 2 and 5, the pressure exerted by the member 2 on the work gripping member 5 forces the member 5 into the cylindrical housing 6, causing the plunger 11 to engage the insert A and force it through the funnel 9 into the clamped sleeve B, as shown in Fig. 6 of the drawings.

Means is provided for entering the core C into the rubber insert A immediately after the entry of the insert A into the sleeve B and while the sleeve B is clamped between the members 2 and 5 and while the insert is engaged by the plunger 11 as shown in Fig. 6. The core entering means is in the form of a core inserting plunger 38 that has a sliding fit in the bore 12 and that is attached to a slide 39 mounted in the way 3 for movement toward and away from the work pressing member 2. The plunger 38 is provided at its inner end with a reduced portion 40 that is of a size to fit within a tubular core C and of a length corresponding to the tubular core C. The plunger 38 is movable from a retracted position in which its inner end is disposed outwardly of the slot 13 as shown in Fig. 5, to a position in which a core positioned on the end portion 40 of the plunger is entered into an insert A within the sleeve B as shown in Fig. 7. Prior to the actuation of the plunger 38 a core C is dropped into the bore 12 through the slot 13 where it is picked up by the plunger 38 during the advancing movement of the plunger toward the sleeve and insert clamped between the members 2 and 5.

A crank 41 on a transverse shaft 42 mounted on the bed 1 operates the slide 39 through a connecting rod 43 to impart reciprocations to the core inserting plunger 38. A single revolution is imparted to the crankshaft 42 during each cycle of operation of the machine to reciprocate the core inserting plunger 38. The crankshaft 42 is actuated by a flywheel pulley 44 to which the crankshaft 42 is intermittently connected by means of a single revolution clutch 45. The single revolution clutch may be of any suitable type adapted to be controlled by a trip member such as a latch lever 46.

The clutch herein shown includes a polygonal cam 47 fixed to the shaft 42, a drum 48 fixed to the pulley 44 that has an internally cylindrical face surrounding the cam 47 and an annular cage 49 rotatable on the shaft 42 and carrying rollers 50 that are movable with the cage from positions in which each roller is positioned centrally of a flat face of the cam where they permit the drum 48 to turn freely about the cam 47 to positions where the rollers 50 are wedged between the cam 47 and drum 48 and providing a driving connection between the drum 48 and crankshaft 42. The cage 49 is shifted by means of a disk-shaped lever 51 that is connected to a collar 52 fixed to the shaft 42 by a pivot 53. The disk-shaped lever has a central opening 54 that is somewhat larger than the portion of the shaft 42 that extends through it so as to permit the lever 51 to have a short swinging movement on the pivot 53.

The disk-shaped lever 51 is connected to the cage 49 by a pivot 55 so that an angular movement of the disk about the pivot 53 imparts a turning movement to the cage 49. A spring 56 connected at one end to the disk-shaped lever 51 and at the other end to the collar 52 exerts a thrust on the disk-shaped lever 51 that tends to shift the cage 49 toward clutching position. The latch lever 46 has a tooth 57 that is engageable with a tooth 58 on the disk-shaped lever 51 to arrest the turning movement of the lever 51 and swing the same about its pivot 53 to clutch releasing position and to hold the shaft 42 against rotation. The latch lever is biased toward its engaging position and is moved out of engagement with the tooth 58 by suitable means such as a solenoid 59. Energization of the solenoid 59 moves the lever 46 out of clutch engaging position, permitting the spring 56 to shift the cage 49 to clutching position. The solenoid 59 is only momentarily energized so that the toothed end of the lever 46 drops into engagement with the periphery of the disk-shaped lever 51 before the shaft 42 makes a complete revolution and rides thereon until its tooth 57 engages the tooth 58 and shifts the lever 51 in opposition to the spring 56 to disengage the clutch.

The core inserting plunger 38 is reciprocated in timed relation to the movements of the work pressing member 2 to insert the core C after the insert A has been pressed into the sleeve B and before the member 2 is retracted.

At its inner end the plunger 38 has a tapering pilot 60 positioned immediately in advance of the core receiving portion 40. The pilot 60 is coaxial with the plunger and its large end that is positioned adjacent the core receiving portion of the plunger is of a diameter corresponding to that of the core receiving portion 40 so that as the plunger advances in the bore 12 the pilot 60 enters a core C previously placed in the bore and guides the same onto the portion 40 of the plunger. The pilot 60 is preferably detachably secured to the plunger and has a projection 61 that extends into a socket 62 formed in the end of the plunger. The depth of the socket is less than the projection 61. The pilot has a flat face 63 around the projection 61 that is spaced from the end of the plunger to provide a circumferentially continuous channel 64 that opens radially outwardly between the pilot and plunger. The plunger is of tubular form and fluid under pressure can be delivered to the plunger through a flexible hose 65 connected to the plunger. The portion 40 of the plunger has a solid end 66 provided with axial passages 67 through which fluid pressure is delivered to the channel 64 during the passage of the pilot 60 through an insert A within a sleeve B clamped between the press members 2 and 5. The fluid under pressure, preferably a liquid, is discharged radially outwardly through the channel 64 against the interior of the insert to exert a pressure against the interior of the insert immediately in advance of the core to expand the insert, the liquid also serving to lubricate the core and insert during the entry of the core into the insert.

As shown diagrammatically in Fig. 10, the delivery of pressure to the cylinder 4 to operate the press member 2 is controlled by valve 68 which controls the delivery of pressure from a pressure line 69 to the cylinder 4. Lines 70 and 71 connect the valve 68 to the inner and outer ends of the cylinder 4 and the valve 68 is normally positioned to connect the line 70 to the pressure line 69 to hold the press member 2 in retracted position. The valve 68 is provided with two exhaust outlets 72 and in the normal position of the valve the line 70 is connected through the valve 68 to the pressure line 69 and the line 71 is connected through the valve 68 to an exhaust outlet 72. The valve 68 is moved by a solenoid 73 from its normal position to a position where it connects the line 71 to the pressure line 69 and the line 70 to an exhaust outlet 72 to reverse the pressure in cylinder 4 and advance the press member 2.

Delivery of pressure to the plunger 38 is controlled by a valve 74 that is normally held in a closed position, but which is adapted to be opened by a solenoid 75 to connect the plunger 38 through the hose 65 and the valve 74 to a pressure line 76. The valve 74 is actuated to deliver pressure to the plunger 38 by means of the solenoid 75.

The plunger and press members are normally positioned as shown in Figures 1 and 5 and prior to each actuation of the machine an insert A is placed on the seat 10, a sleeve B on the seats 32 and 36 and a core C is inserted through the slot 13 into the bore 12. With the insert A, sleeve B and core C so positioned the work pressing member 2 is first advanced to clamp the sleeve B and to force the insert A into the sleeve B, the plunger 38 is reciprocated to enter the core C into the insert A and the member 2 is retracted to release the assembled bushing. Suitable means is provided for effecting these operations in the proper sequence as diagrammatically illustrated in Fig. 10. As shown in Fig. 10, a push button switch 77 is provided for starting the machine into operation. The switch 77, when closed, energizes the solenoid 73 to actuate the valve 68 to reverse the pressure in the cylinder 4 to advance the press member 2. The solenoid 73, when energized, closes a normally open switch 78 that establishes a holding circuit through the switch 78 and a normally closed trip switch 79 that is in series with the switch 78. The press member 2 carries a trip member 80 that engages a normally open switch 81 to close the same as the member 2 nears the end of its advancing movement. The switch 81, when closed, energizes the solenoid 59 to release the latch lever 46 to engage the clutch 45 and impart a single revolution to the crankshaft 42 to reciprocate the plunger 38.

During the advancing movement of the press member 2 the insert A is forced by the plunger 11 through the funnel 9 into the sleeve B, and the sleeve B is clamped between the members 2 and 5. The return movement of the press member 2 should start as the plunger 38 nears the end of its advancing movement and the said return movement of the member 2 may be controlled by the plunger. For so controlling the return movement of the member 2, the slide 39 which carries the plunger 38 has a retractable trip member 82 that is mounted on a pivot 83 and that is held in its tripping position against a stop 84 by a spring 85. During the advancing movement of the plunger 38 and during the portion of the plunger stroke in which the pilot 60 is entering the insert A, the trip member 82 engages a trip arm 86 that operates a normally open switch 87, which when closed energizes the solenoid 75 to open the valve 74 and deliver liquid under pressure from the line 76 to the plunger 38. The solenoid 75, when energized, closes a normally open switch 88 that completes a holding circuit for the solenoid 75 through the switch 79. The solenoid 75 remains energized until the trip 82 on the plunger carrying slide 39 engages a trip arm 89 that operates the normally closed switch 79 to break the holding circuit and deenergize the solenoid 75. The distance between the trip arms 86 and 89 corresponds substantially to the length of the core C so that liquid under pressure is discharged through the plunger only during the portion of its stroke during which the core is being entered into the insert. The positions of the switches 87 and 79 determine the time interval during which pressure is delivered to the plunger 38 and the time at which the press member 2 starts its return movement and these switches are preferably adjustable independently longitudinally of the bed 1 by means of screws 90 and 91. During the return stroke of the plunger the trip member 82 can be moved inwardly against the spring 85 while passing the trip arms 86 and 89. The opening of the switch 79 also deenergizes the solenoid 73 to reverse the pressure in the cylinder 4 and retract the press member 2.

During the operation of the machine the pressure applying member 2 is first advanced to its closed position to force the insert A into the sleeve B and to clamp the sleeve and insert in position to receive the core C. Near the completion of the advancing movement of the press member 2 the reciprocation of the plunger 38 is initiated by the engagement of the trip member 80 with the switch 81. During the advancing movement of the plunger 38 the trip member 82 engages the trip arm 86 to cause fluid under pressure to be delivered to the plunger 38 at the instant that a core C on the plunger is brought into engagement with an insert A previously pressed into a sleeve B. As the plunger 38 approaches the end of its advancing movement the trip member 82 engages the trip arm 89 to open the switch 79 and deenergize the solenoid 73 to reverse the pressure in the cylinder 4 and cause retraction of the press member 2 and to simultaneously deenergize the solenoid 75 to close the valve 74 and discontinue the delivery of liquid under pressure to the plunger.

It is to be understood that in accordance with the provisions of the patent statutes, variations and modifications of the specific devices herein shown and described may be made without departing from the spirit of the invention.

What we claim is:

1. In a machine for assembling a resilient bushing that has a rigid outer sleeve, a rigid tubular core and a tubular insert of elastic rubber under radial compression between the sleeve and core, an axially movable plunger that has a core receiving end portion that is of reduced diameter, of a size to slidably fit within the core and of a length corresponding substantially to the length of the core and that terminates in a tapered pilot portion beyond the end of said core receiving portion and of a size to pass through a core moving onto or off said receiving portion, said plunger having passages for discharging fluid under pressure radially outwardly at the juncture of said core receiving portion and said pilot portion, means for supporting a sleeve with an elastic rubber insert therein in the path of said plunger and in axial alinement therewith, actuating means for advancing said plunger into engagement with the insert to enter a core on the core receiving end of the plunger into the insert, and means for delivering fluid under pressure through said passages to progressively expand the tubular insert immediately in advance of the core during passage of the pilot portion of the plunger through the tubular insert.

2. In a machine for assembling a resilient bushing that has a rigid outer sleeve, a rigid tubular core and a tubular insert of elastic rubber under radial compression between the sleeve and core, an axially movable plunger that has a core receiving end portion that is of reduced diameter, of a size to slidably fit within the core and of a length corresponding substantially to the length of the core and that terminates in a coaxial tapered pilot portion beyond the end of said core receiving portion and of a size to pass through a core moving onto or off said receiving portion, said plunger having passages for discharging fluid under pressure radially outwardly at the juncture of said core receiving portion and said pilot portion, means for supporting a sleeve with an elastic rubber insert therein in the path of said plunger and in axial alinement therewith, actuating means for advancing said plunger into engagement with the insert to enter a core on the core receiving end of the plunger into the insert, and means timed with respect to the advancing movement of the plunger for delivering fluid under pressure through said passages and against the interior of the insert upon entry of said pilot portion into the tubular insert to progressively expand the tubular insert immediately in advance of the core during the passage of the pilot portion of the plunger through the tubular insert.

3. In a machine for assembling a resilient bushing that has a rigid outer sleeve, a rigid tubular core and a tubular elastic rubber insert under radial compression between the sleeve and core, a pair of work clamping members for clamping an assembled insert and sleeve, one of said members having a sleeve positioning socket, one of said members having an opening axially alined with said socket, a plunger coaxial with said socket and mounted for axial movement through said opening toward and away from a sleeve and insert clamped between said members, said plunger having a core receiving end portion of reduced diameter that is of substantially the same length as a core and a tapered pilot portion beyond said core receiving portion that is coaxial with said core receiving portion and of a size to pass through a core moving onto or off said receiving portion, said plunger and pilot being formed to provide a channel opening radially outwardly throughout the circumference of the plunger and pilot between said pilot and the core receiving portion of the plunger, said plunger having passages for delivering fluid under pressure to said channel, actuating means for reciprocating said plunger, and means timed with respect to the advancing movement of said plunger for delivering fluid under pressure to said plunger and through the plunger to said channel upon entry of said pilot into the tubular insert to progressively expand the tubular insert immediately in advance of the core during passage of the pilot through an insert clamped by said members.

References Cited in the file of this patent
UNITED STATES PATENTS

| | | |
|---|---|---|
| 788,568 | Welsh | May 2, 1905 |
| 1,461,130 | Loughead | July 10, 1923 |
| 1,803,491 | Thiry | May 5, 1931 |
| 1,913,933 | Lamborn et al. | June 13, 1933 |
| 2,604,658 | Broden | July 29, 1952 |
| 2,660,780 | Beck | Dec. 1, 1953 |